(12) United States Patent
Kim et al.

(10) Patent No.: US 12,054,025 B2
(45) Date of Patent: Aug. 6, 2024

(54) APPARATUS AND METHOD FOR CONTROLLING SUSPENSION OF VEHICLE

(71) Applicants: HYUNDAI MOTOR COMPANY, Seoul (KR); KIA CORPORATION, Seoul (KR)

(72) Inventors: Hyung Jin Kim, Seoul (KR); Young Jae Kim, Yongin-si (KR); Yoon Kab Noh, Gunpo-si (KR); Jong Hoon Choi, Hwaseong-si (KR); In Yong Jung, Incheon (KR); Byung Joo Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 364 days.

(21) Appl. No.: 17/313,186

(22) Filed: May 6, 2021

(65) Prior Publication Data

US 2022/0105772 A1 Apr. 7, 2022

(30) Foreign Application Priority Data

Oct. 5, 2020 (KR) ........................ 10-2020-0128301

(51) Int. Cl.
*B60G 17/0165* (2006.01)

(52) U.S. Cl.
CPC .... *B60G 17/0165* (2013.01); *B60G 2400/821* (2013.01); *B60G 2400/823* (2013.01); *B60G 2400/847* (2013.01); *B60G 2500/10* (2013.01)

(58) Field of Classification Search
CPC .......... B60G 17/0165; B60G 2400/821; B60G 2400/823; B60G 2400/847;
(Continued)

(56) References Cited

U.S. PATENT DOCUMENTS

| 5,699,056 A | 12/1997 | Yoshida |
| 8,762,000 B2 | 6/2014 | Schindler et al. |

(Continued)

FOREIGN PATENT DOCUMENTS

| DE | 102015205369 A1 | 10/2015 |
| KR | 10-2019-0128290 A | 11/2019 |
| KR | 10-2021-0022296 A | 3/2021 |

OTHER PUBLICATIONS

Office action issued on Sep. 8, 2023 for the related U.S. Appl. No. 17/313,173. 12pp.
(Continued)

*Primary Examiner* — Anne Marie Antonucci
*Assistant Examiner* — Jodi Marie Jones
(74) *Attorney, Agent, or Firm* — Lempia Summerfield Katz LLC

(57) ABSTRACT

An apparatus for controlling a suspension of a vehicle includes: an illuminance sensor that measures illuminance outside the vehicle, a camera that takes an image of a road surface ahead the vehicle, and a controller that recognizes an obstacle located on the road surface based on the image of the road surface ahead the vehicle, determines a type of the obstacle depending on the measured illuminance outside the vehicle, and controls a damping force of the suspension based on control information corresponding to the type of the obstacle when the vehicle passes over the obstacle.

18 Claims, 14 Drawing Sheets

(58) Field of Classification Search
CPC .......... B60G 2500/10; B60G 2401/142; B60G 2600/02; B60G 17/06; B60G 17/015; B60G 17/019; B60W 10/22; B60W 40/06; B60W 2420/42; B60W 2552/35; B60W 2552/50; B60R 21/0134; G06V 20/56

USPC .................................. 701/37, 65, 253, 30.8

See application file for complete search history.

(56) References Cited

U.S. PATENT DOCUMENTS

| | | | |
|---|---|---|---|
| 9,855,949 B2 | 1/2018 | Tomatsu et al. | |
| 10,406,882 B2 | 9/2019 | Lakehal-ayat | |
| 10,967,849 B2 | 4/2021 | Jang | |
| 11,267,307 B2 | 3/2022 | Lakehal-ayat | |
| 2013/0103259 A1 | 4/2013 | Eng et al. | |
| 2013/0258108 A1* | 10/2013 | Ono ........................ | H04N 7/18 348/148 |
| 2014/0195112 A1* | 7/2014 | Lu ........................ | B60G 17/015 703/2 |
| 2015/0166072 A1 | 6/2015 | Powers et al. | |
| 2015/0352920 A1 | 12/2015 | Lakehal-ayat | |
| 2016/0111089 A1 | 4/2016 | Kim | |
| 2016/0259983 A1* | 9/2016 | Tani ........................ | G06V 20/58 |
| 2019/0344634 A1 | 11/2019 | Kim | |
| 2020/0016952 A1 | 1/2020 | Lakehal-ayat | |
| 2020/0221270 A1 | 7/2020 | Ikkaku | |
| 2020/0384979 A1 | 12/2020 | Hiraga | |
| 2020/0396292 A1 | 12/2020 | Ono | |
| 2021/0009165 A1 | 1/2021 | Sugimoto et al. | |
| 2021/0053409 A1 | 2/2021 | Kim | |
| 2021/0114559 A1 | 4/2021 | Okura | |
| 2021/0269062 A1 | 9/2021 | Yasutomi et al. | |
| 2021/0383140 A1 | 12/2021 | Kim | |
| 2022/0097557 A1 | 3/2022 | Lee et al. | |

OTHER PUBLICATIONS

Office Action cited in German patent application No. 10 2021 112 874.9; Nov. 8, 2023; 7 pp.

Office action issued on Sep. 29, 2023 for the related U.S. Appl. No. 17/313,173. 13pp.

1 Office action issued on Mar. 15, 2024 for the related U.S. Appl. No. 17/313,173. 10pp.

* cited by examiner

APPARATUS AND METHOD FOR CONTROLLING SUSPENSION OF VEHICLE

CROSS-REFERENCE TO RELATED APPLICATION

This application claims priority to and the benefit of Korean Patent Application No. 10-2020-0128301, filed Oct. 5, 2020, the entire contents of which are incorporated herein by reference.

FIELD

The present disclosure relates to a technology for improving ride comfort by controlling a suspension of a vehicle.

BACKGROUND

The statements in this section merely provide background information related to the present disclosure and may not constitute prior art.

In general, when a vehicle passes over a bump or a pothole in a road at a predetermined speed or more, the bottom of the vehicle may be scratched, or a safety accident may occur due to shock or vibration.

A suspension of a vehicle is an apparatus that is connected with a vehicle axle and that is controlled such that vibration or shock from a road is not directly transmitted to a vehicle body during travel of the vehicle, thereby preventing damage to the vehicle body, a passenger, or freight and a safety accident and improving ride comfort of the vehicle.

The suspension, called a suspension apparatus, may include a chassis spring that alleviates shock from a road, a shock absorber that controls free vibration of the chassis spring to improve ride comfort, and a stabilizer bar that prevents rolling of the vehicle.

Recently-released vehicles are equipped with Electronically Controlled Suspension (ECS) that automatically adjusts the strength of the suspension depending on a driving situation or a state of a road surface.

The Electronically Controlled Suspension (ECS) may detect driving state information, such as a vehicle speed, a steering angle, up and down acceleration of a vehicle body, and the like, and road-surface information through various sensors and may electronically automatically control the spring constant of the suspension, the damping force of a shock absorber, the posture of the vehicle body, the vehicle height, and the like according to a road-surface state.

Electronically controlled suspension (ECS) may be classified into an active suspension that controls a movement of a vehicle body by applying external energy to the suspension using an actuator and a semi-active suspension that adjusts a damping force using an actuator as an auxiliary spring.

A conventional technology for controlling electronically controlled suspension controls the suspension without a process of predicting impulse that is to be applied to a vehicle due to an obstacle (e.g., a bump or a pothole) in a road and a suspension control value corresponding to pitch. Therefore, the conventional control technology fails to rapidly and stably respond.

The above information disclosed in this Background section is only for enhancement of understanding of the background of the present disclosure and therefore it may contain information that does not form any part of the prior art nor what the prior art may suggest to a person of ordinary skill in the art.

SUMMARY

The present disclosure has been made to solve the above-mentioned problems occurring in the prior art while advantages achieved by the prior art are maintained intact.

An aspect of the present disclosure provides a vehicle suspension control apparatus and method for improving ride comfort by recognizing an obstacle located on a road surface ahead a vehicle, determining the type of the obstacle depending on brightness (e.g., an illuminance value) outside the vehicle, and controlling suspension based on control information corresponding to the type of the obstacle when the vehicle passes over the obstacle.

The technical problems to be solved by the present disclosure are not limited to the aforementioned problems, and any other technical problems not mentioned herein will be clearly understood from the following description by those skilled in the art to which the present disclosure pertains. Also, it will be easily understood that the aspects and advantages of the present disclosure can be accomplished by the means set forth in the appended claims and combinations thereof.

According to an aspect of the present disclosure, an apparatus for controlling suspension of a vehicle includes an illuminance sensor that measures illuminance outside the vehicle, a camera that takes an image of a road surface ahead the vehicle, and a controller that recognizes an obstacle located on the road surface based on the image of the road surface ahead the vehicle, determines a type of the obstacle depending on the illuminance outside the vehicle, and controls a damping force of the suspension based on control information corresponding to the type of the obstacle when the vehicle passes over the obstacle.

In an exemplary form of the present disclosure, the controller may divide the illuminance outside the vehicle into a plurality of sections and may differently set criteria for determining the type of the obstacle in the respective sections.

In an exemplary form of the present disclosure, the obstacle may include at least one of a bump or a pothole located in the road surface on which the vehicle travels.

When the measured illuminance exceeds a first reference illuminance value, the controller is configured to determine the type of the obstacle from at least four types of bumps having different shape. In one form, the at least four types of bumps include a first type of bump, a second type of bump, a third type of bump and a fourth type of bump, which have different heights and different lengths.

In another form, the bump may be determined as at least one of a bump of a first type, a bump of a second type, a bump of a third type, or a bump of a fourth type.

In another form of the present disclosure, the controller may determine the type of the obstacle to be one of the bump of the first type, the bump of the second type, the bump of the third type, or the bump of the fourth type, when the illuminance outside the vehicle exceeds a first reference illuminance value.

In an exemplary form of the present disclosure, the controller may set a plurality of control sections corresponding to the determined bump and may control the damping force of the suspension in each of the plurality of control sections when the vehicle passes over the determined bump.

In an exemplary form of the present disclosure, when the illuminance outside the vehicle exceeds a second reference illuminance value, the controller may integrate a criterion for determining the bump of the fourth type into a criterion for determining the bump of the third type and may determine the type of the obstacle to be one of the bump of the first type, the bump of the second type, or the bump of the third type.

In an exemplary form of the present disclosure, the controller may set a plurality of control sections corresponding to the determined bump and may control the damping force of the suspension in each of the plurality of control sections when the vehicle passes over the determined bump.

In an exemplary form of the present disclosure, when the illuminance outside the vehicle does not exceed a second reference illuminance value, the controller may integrate a criterion for determining the bump of the first type into a criterion for determining the bump of the second type, may integrate a criterion for determining the bump of the fourth type into a criterion for determining the bump of the third type, and may determine the type of the obstacle to be the bump of the second type or the bump of the third type.

In an exemplary form of the present disclosure, the controller may set a plurality of control sections corresponding to the determined bump and may control the damping force of the suspension in each of the plurality of control sections when the vehicle passes over the determined bump.

According to another aspect of the present disclosure, a method for controlling suspension of a vehicle includes measuring, by an illuminance sensor, illuminance outside the vehicle, taking, by a camera, an image of a road surface ahead the vehicle, recognizing, by a controller, an obstacle located on the road surface based on the image of the road surface ahead the vehicle, determining, by the controller, a type of the obstacle depending on the illuminance outside the vehicle, and controlling, by the controller, a damping force of the suspension based on control information corresponding to the type of the obstacle when the vehicle passes over the obstacle.

In one form of the present disclosure, the determining of the type of the obstacle may include dividing the illuminance outside the vehicle into a plurality of sections and differently setting criteria for determining the type of the obstacle in the respective sections.

In one form of the present disclosure, the determining of the type of the obstacle may include determining the type of the obstacle to be one of the bump of the first type, the bump of the second type, the bump of the third type, or the bump of the fourth type, when the illuminance outside the vehicle exceeds a first reference illuminance value.

In another form of the present disclosure, the controlling of the damping force of the suspension may include setting a plurality of control sections corresponding to the determined bump and controlling the damping force of the suspension in each of the plurality of control sections when the vehicle passes over the determined bump.

In another form of the present disclosure, the determining of the type of the obstacle may include integrating a criterion for determining the bump of the fourth type into a criterion for determining the bump of the third type, when the illuminance outside the vehicle exceeds a second reference illuminance value, and determining the type of the obstacle to be one of the bump of the first type, the bump of the second type, or the bump of the third type.

In another form of the present disclosure, the controlling of the damping force of the suspension may include setting a plurality of control sections corresponding to the determined bump and controlling the damping force of the suspension in each of the plurality of control sections when the vehicle passes over the determined bump.

In an exemplary form of the present disclosure, the determining of the type of the obstacle may include integrating a criterion for determining the bump of the first type into a criterion for determining the bump of the second type and integrating a criterion for determining the bump of the fourth type into a criterion for determining the bump of the third type, when the illuminance outside the vehicle does not exceed a second reference illuminance value, and determining the type of the obstacle to be the bump of the second type or the bump of the third type.

In an exemplary form of the present disclosure, the controlling of the damping force of the suspension may include setting a plurality of control sections corresponding to the determined bump and controlling the damping force of the suspension in each of the plurality of control sections when the vehicle passes over the determined bump.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
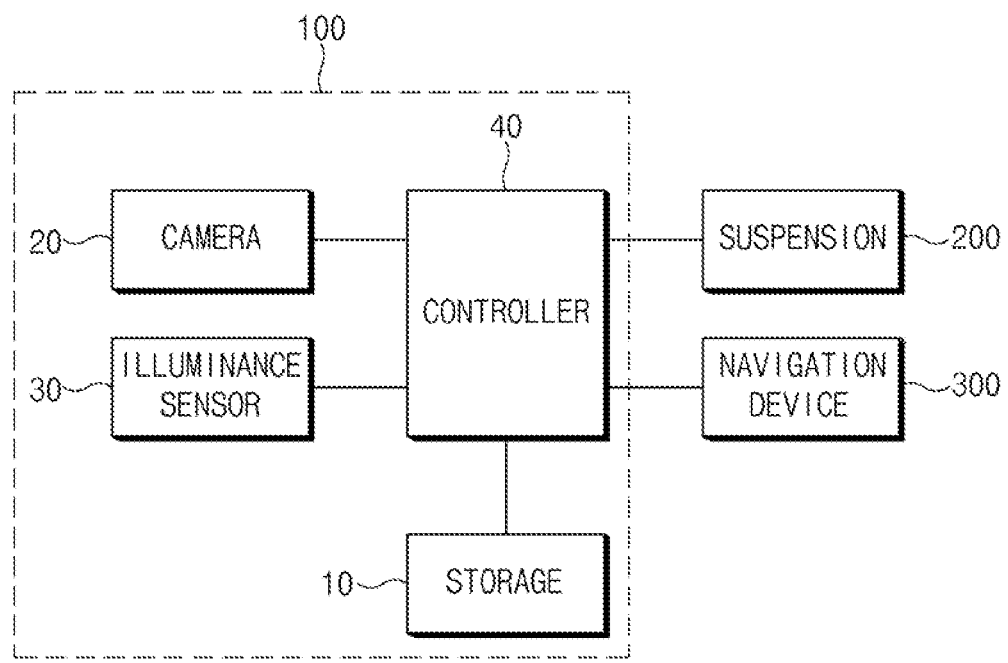
FIG. 1 is a view illustrating a configuration of a vehicle suspension control apparatus according to an exemplary form of the present disclosure.

The drawings described herein are for illustration purposes only and are not intended to limit the scope of the present disclosure in any way.

DETAILED DESCRIPTION

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary forms of the present disclosure, a detailed description of well-known features or functions will be ruled out in order not to unnecessarily obscure the gist of the present disclosure.

The following description is merely exemplary in nature and is not intended to limit the present disclosure, application, or uses. It should be understood that throughout the drawings, corresponding reference numerals indicate like or corresponding parts and features.

In describing the components of the forms according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of a vehicle suspension control apparatus according to an exemplary form of the present disclosure.

As illustrated in FIG. 1, the vehicle suspension control apparatus 100 according to the exemplary form of the present disclosure may include storage 10, a camera 20, an illuminance sensor 30, and a controller 40. Depending on a way of carrying out the vehicle suspension control apparatus 100 according to the form of the present disclosure, the components may be combined together to form one entity or some of the components may be omitted.

The storage 10 may store various logics, algorithms, and programs required in a process of recognizing an obstacle (e.g., a bump or a pothole) located in a road surface ahead a vehicle, based on an image of the road surface that is obtained through the camera 20, determining the type of the obstacle depending on brightness (e.g., an illuminance value) outside the vehicle, and controlling suspension 200 based on control information corresponding to the type of the obstacle when the vehicle passes over the obstacle.

The storage 10 may store the control information corresponding to the type of the obstacle. The control information, which is damping force control information, may include a damping control value, a sky hook control value, and a preview control value.

The storage 10 may store a first reference illuminance value and a second reference illuminance value. The first reference illuminance value and the second reference illuminance value may be changed depending on a designer's intent. For example, the first reference illuminance value may be an illuminance value measured in the shade in the daytime, and the second reference illuminance value may be an illuminance value measured at any point between the time right before the sun sets and the time before the sun completely sets. Accordingly, the first reference illuminance value is greater than the second reference illuminance value, but the present disclosure is not necessarily limited thereto.

Figure 2:
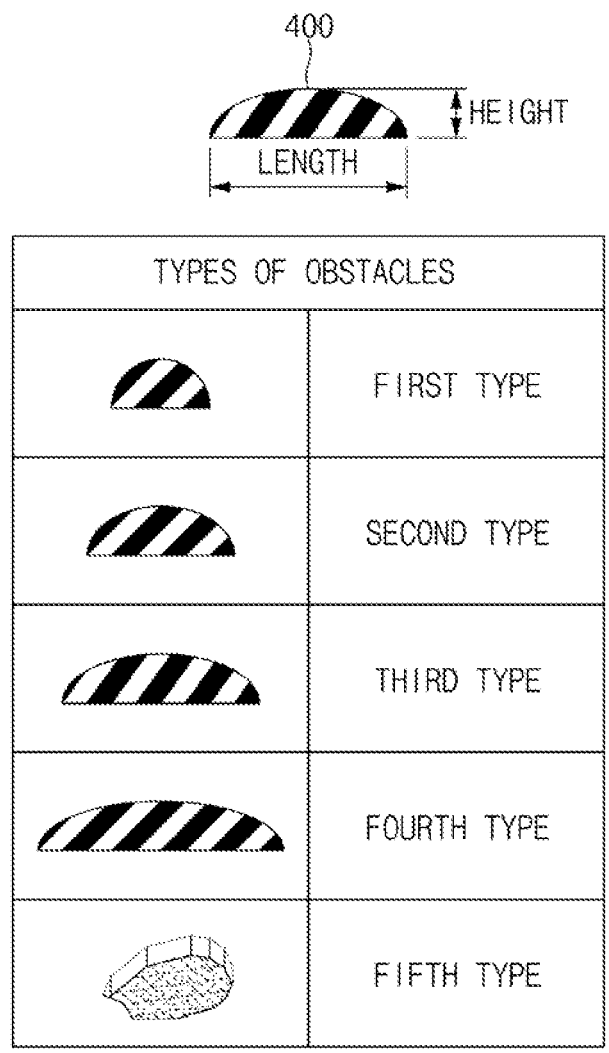
FIG. 2 is an exemplary view illustrating types of obstacles used in the vehicle suspension control apparatus according to an exemplary form of the present disclosure.

The storage 10 may include different types of obstacles as illustrated in FIG. 2.

FIG. 2 is an exemplary view illustrating types of obstacles used in the vehicle suspension control apparatus according to an form of the present disclosure.

As illustrated in FIG. 2, the obstacles used in the vehicle suspension control apparatus according to the form of the present disclosure may include bumps and a pothole located in a road on which the vehicle travels.

For example, a first type may be a bump having a height of 7.5 cm and a length of 1 m, a second type may be a bump having a height of 7.5 cm and a length of 2 m, a third type may be a bump having a height of 10 cm and a length of 3.6 m, a fourth type may be a bump having a height of 12.5 cm and a length of 6.1 m, and a fifth type is a pothole.

The storage 10 may include at least one type of storage medium among memories of a flash memory type, a hard disk type, a micro type, and a card type (e.g., a Secure Digital (SD) card or an eXtream Digital (XD) card) and memories of a Random Access Memory (RAM) type, a Static RAM (SRAM) type, a Read-Only Memory (ROM) type, a Programmable ROM (PROM) type, an Electrically Erasable PROM (EEPROM) type, a Magnetic RAM (MRAM) type, a magnetic disk type, and an optical disk type.

The camera 20 may be mounted on, for example, a front windshield of the vehicle and may take an image of a road surface ahead the vehicle. The camera 20 may recognize an object included in the image of the road surface and may extract information about the object (e.g., the height, the depth, the length, and the like of the object). For example, the image of the road surface that the camera 20 provides to the controller 40 is as illustrated in FIG. 3.

Figure 3:
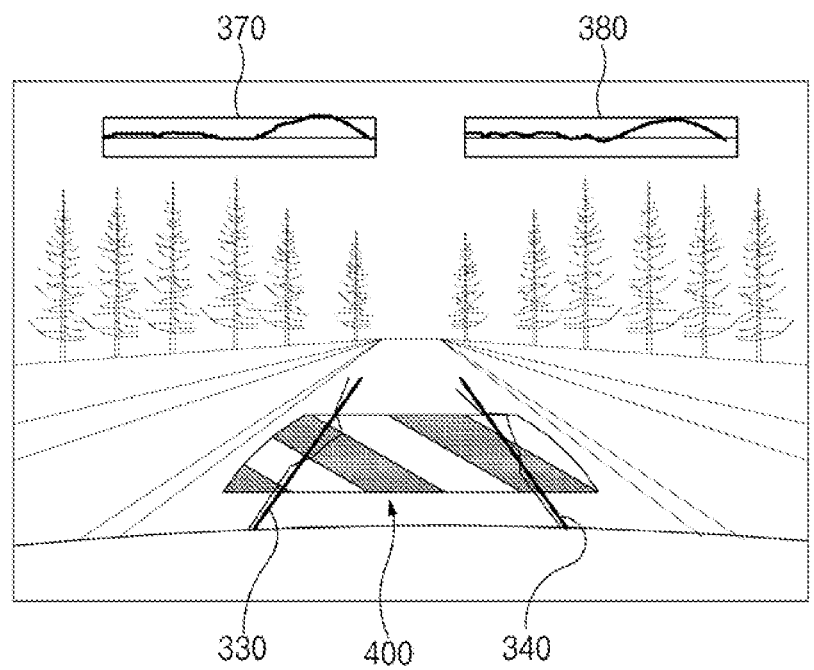
FIG. 3 is an exemplary view illustrating an image of a road surface taken with a camera included in the vehicle suspension control apparatus according to one form of the present disclosure.

FIG. 3 is an exemplary view illustrating an image of a road surface taken with the camera included in the vehicle suspension control apparatus according to an exemplary form of the present disclosure.

As illustrated in FIG. 3, the camera 20 included in the vehicle suspension control apparatus may take an image of a road surface ahead the vehicle and may display information about an object on the image of the road surface.

For example, the image of the road surface may include an expected travel path 330 of left wheels of the vehicle and an expected travel path 340 of right wheels of the vehicle and may further include the height 370 of a left side of a bump 400 and the height 380 of a right side of the bump 400.

In the references characteristics "370" and "380", the vertical axis represents height, and the horizontal axis represents length.

The camera 20 may transmit, to the controller 40, the image of the road surface (image data) that includes the expected travel path 330 of the left wheels of the vehicle, the expected travel path 340 of the right wheels of the vehicle, the height 370 of the left side of the bump 400, and the height 380 of the right side of the bump 400.

The camera 20 may be electrically connected with the controller 40. The camera 20 may be connected with the controller 40 through a vehicle network. Alternatively, the camera 20 may be connected with the controller 40 through a hard wire. In another case, the camera 20 may be connected with the controller 40 through a Printed Circuit Board (PCB). The camera 20 may transfer, to the controller 40, the image (image data) of the road surface ahead the vehicle. Here, the vehicle network may include a Controller Area Network (CAN), a Controller Area Network with Flexible Data-rate (CAN FD), a Local Interconnect Network (LIN), FlexRay, Media Oriented Systems Transport (MOST), Ethernet, or the like.

The illuminance sensor 30 may be mounted on the exterior of the vehicle and may measure illuminance. The illuminance sensor 30 may be electrically connected with the controller 40 and may transfer the measured illuminance to the controller 40.

The controller 40 may perform overall control to enable the components to normally perform functions thereof. The controller 40 may be implemented in the form of hardware or software, or in a combination thereof. The controller 40 may be implemented with, but is not limited to, a microprocessor.

In particular, the controller 40 may perform various controls in a process of recognizing an obstacle (e.g., a bump or a pothole) located in the road surface ahead the vehicle, based on the image of the road surface that is transferred from the camera 20, determining the type of the obstacle depending on brightness (e.g., an illuminance value) outside the vehicle, and controlling the suspension 200 based on control information corresponding to the type of the obstacle when the vehicle passes over the obstacle.

The controller 40 may be electrically connected with the suspension 200 and may control an operation of the suspension 200.

For reference, the suspension 200 may include a spring (not illustrated) and a damper (not illustrated) that are provided for each vehicle wheel. The suspension 200 is electronically controlled suspension. The spring performs a reciprocating motion while being compressed or stretched depending on a state of a road surface. The damper is a variable damper capable of adjusting the damping force thereof. The controller 40 may control the damping force of the suspension 200.

The damper may damp vibration generated by the spring when the vehicle passes over an obstacle. In other words, the damper may suppress a reciprocating motion of the spring by applying a force in an opposite direction to that of a force generated by the spring. That is, the force suppressing the motion of the spring is referred to as a damping force.

The damper includes a piston rod and a solenoid valve therein. A resistive force generated in a process in which a fluid flows through a fluid channel formed by the piston rod and the solenoid valve refers to a damping force. The damper generates the damping force through a compression stroke and a rebound stroke. Depending on a movement of the solenoid valve, the width of the fluid channel through which the fluid flows may be adjusted, and thus the damping force may be adjusted. The suspension 200 may control the damping force of the damper, based on a damping force control command and/or a damping force control signal that is input from the controller 40.

The controller 40 may collect driving information, road information, traffic information, and the like from a navigation device 300. In particular, the controller 40 may collect, from the navigation device 300, information about a bump located on a road on which the vehicle travels (e.g., the position, height, and length of the bump, the separation distance between the bump and the vehicle, information about the type of the bump, and the like).

The controller 40 may obtain, from various sensors (e.g., a radar, a speed sensor, an acceleration sensor, a gyro sensor, and the like) equipped in the vehicle, various pieces of information or data required in a process of controlling the suspension 200.

For reference, the radar may include a front radar and a corner radar and may obtain the relative position and the relative speed of a surrounding object (e.g., another vehicle, a pedestrian, a cyclist, or the like). The radar may be installed on a grille or a bumper of the vehicle. The radar may obtain radar data from a transmitted electric wave that is transmitted by a transmitting antenna and a reflected electric wave that is received by a receiving antenna.

The radar data may include at least one of information about a road surface ahead the vehicle or distance information and speed information about another vehicle located around the vehicle. The information about the road surface ahead the vehicle may include information about a bump on the road surface. The radar may calculate the relative distance to an object, based on a phase difference (or a time difference) between a transmitted electric wave and a reflected electric wave and may calculate the relative speed of the object, based on a frequency difference between the transmitted electric wave and the reflected electric wave. The radar may be connected with the controller 40 through a vehicle network, a hard wire, or a printed circuit board. The front radar may transfer front radar data to the controller 40. The above-described radar may be replaced with a LiDAR.

The controller 40 may calculate a pitch rate of the vehicle by processing data transferred from the acceleration sensor and the gyro sensor.

Hereinafter, a process in which the controller 40 determines the type of obstacle based on an illuminance value measured by the illuminance sensor 30 will be described in detail with reference to FIGS. 4A to 4C.

Figure 4A:
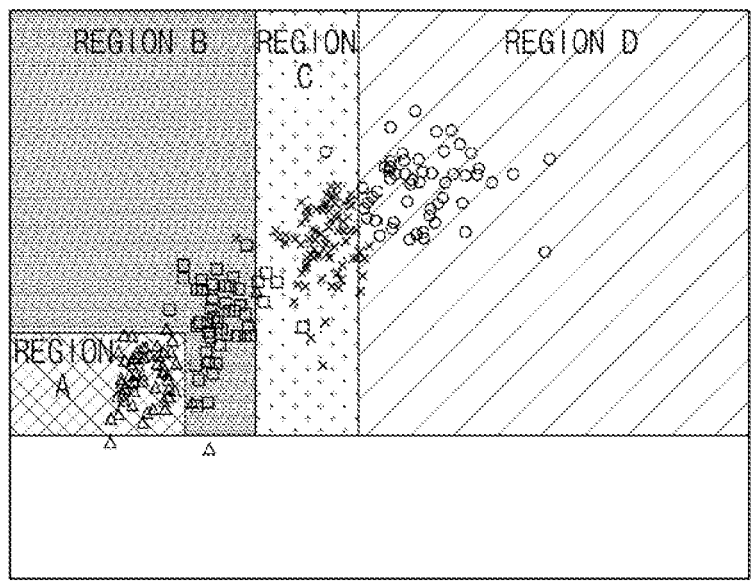
FIG. 4A is an exemplary view illustrating a process in which a controller included in the vehicle suspension control apparatus determines the type of obstacle when an illuminance value exceeds a first reference illuminance value according to one form of the present disclosure.

FIG. 4A is an exemplary view illustrating a process in which the controller included in the vehicle suspension control apparatus determines the type of obstacle when an illuminance value exceeds the first reference illuminance value according to an exemplary form of the present disclosure.

When an illuminance value measured by the illuminance sensor 30 exceeds the first reference illuminance value, it means that it is a bright day. On a bright day, the shape of an obstacle clearly appears in an image of a road surface taken with the camera 20, and thus the controller 40 may accurately determine the type of bump from the image of the road surface.

In FIG. 4A, region "A" represents a bump region of a first type, region "B" represents a bump region of a second type, region "C" represents a bump region of a third type, and region "D" represents a bump region of a fourth type. The vertical axis represents the height of a shape (the height of a bump), and the horizontal axis represents the length of the shape (the length of the bump).

As illustrated in FIG. 4A, the controller 40 accurately classifies a bump of the first type (a triangular shape) as region A, a bump of the second type (a quadrilateral shape) as region B, a bump of the third type (an X-shape) as region C, and a bump of the fourth type (a circular shape) as region D.

Accordingly, when the illuminance value measured by the illuminance sensor 30 exceeds the first reference illuminance value, the controller 40 may control the suspension 200, based on control information corresponding to each type of bump. At this time, the controller 40 may adjust a control value (a damping force) for the suspension 200 as in Table 1 below.

TABLE 1

| Type of Bump | Bump Pass Characteristics of Vehicle | | Control Value |
|---|---|---|---|
| | Impulse | Pitch | |
| First Type | High | Low | Low |
| Second Type | Medium | Low | ↓ |
| Third Type | Medium | Medium | High |
| Fourth Type | Low | High | |

In Table 1 above, in the case of the fourth type, the controller 40 may decrease pitch behavior of the vehicle by increasing a control value. In the case of the first type, the controller 40 may improve impulse by decreasing a control value, and in the case of the second type, the controller 40 may improve impulse by maintaining a control value such that rebound shock does not occur.

Figure 4B:
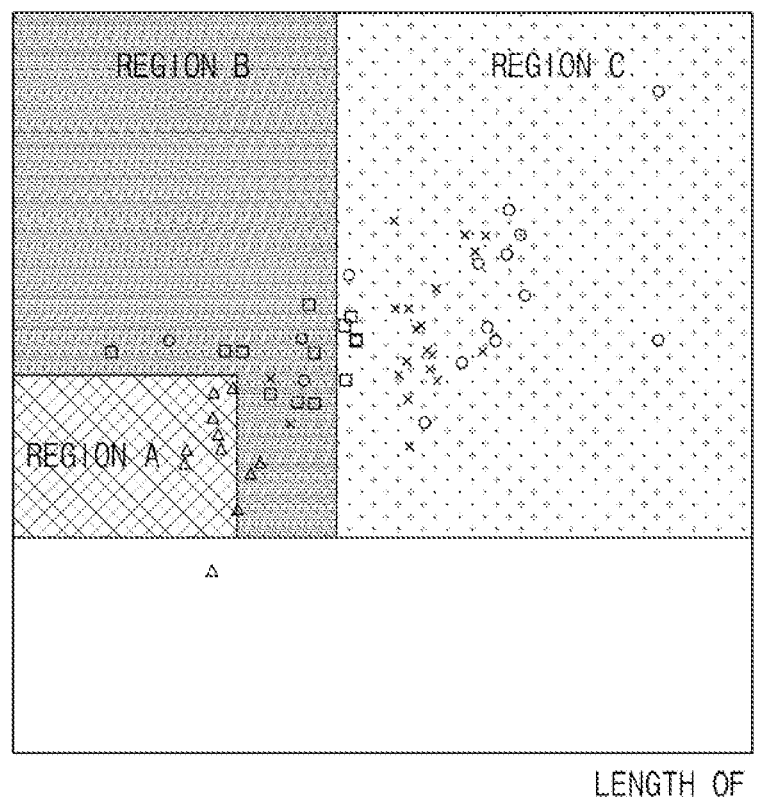
FIG. 4B is an exemplary view illustrating a process in which the controller included in the vehicle suspension control apparatus determines the type of obstacle when an illuminance value exceeds a second reference illuminance value according to one form of the present disclosure.

FIG. 4B is an exemplary view illustrating a process in which the controller included in the vehicle suspension control apparatus determines the type of obstacle when an illuminance value exceeds a second reference illuminance value according to an exemplary form of the present disclosure.

When an illuminance value measured by the illuminance sensor 30 exceeds the second reference illuminance value, it means that the sun starts to set. In the evening, part of the shape of an obstacle does not clearly appear in an image of a road surface taken with the camera 20, and therefore the controller 40 may not clearly recognize the height and length of the obstacle and may not accurately determine the type of bump from the image of the road surface.

As illustrated in FIG. 4B, the controller 40 relatively accurately recognizes the bump of the first type, the bump of the second type, and the bump of the third type, but does not accurately recognize the bump of the fourth type. That is, it can be seen that the controller 40 does not accurately classify the bump of the third type and the bump of the fourth type.

Accordingly, the controller 40 integrates region D into region C and classifies the types of obstacles into the first type, the second type, and the third type. That is, the controller 40 may determine the type of the obstacle to be one of the first type, the second type, or the third type and may control the suspension 200, based on control information corresponding to the relevant type.

Figure 4C:
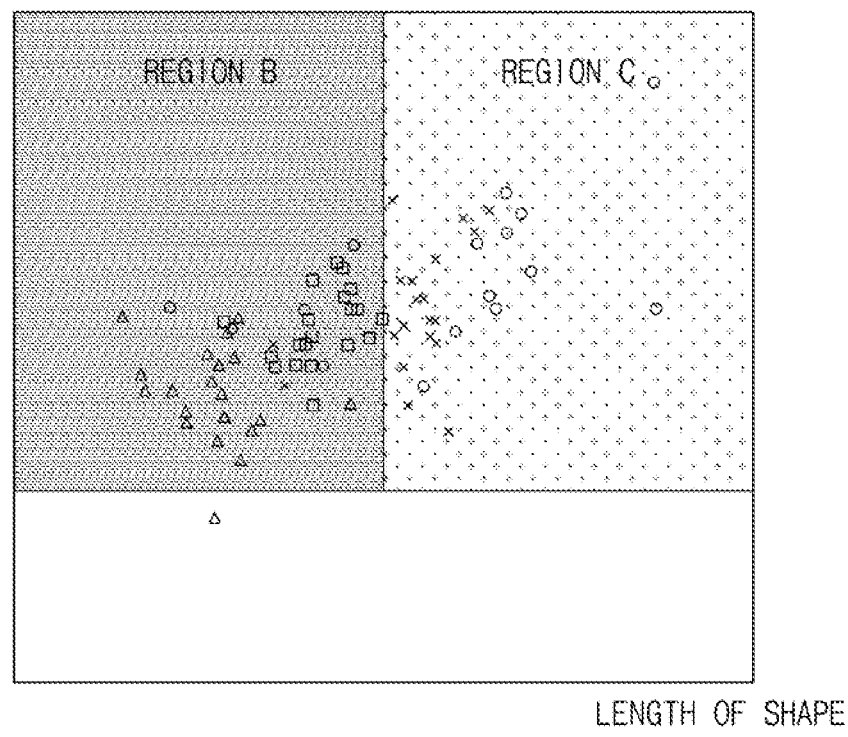
FIG. 4C is an exemplary view illustrating a process in which the controller included in the vehicle suspension control apparatus determines the type of obstacle when an illuminance value does not exceed the second reference illuminance value according to one form of the present disclosure.

FIG. 4C is an exemplary view illustrating a process in which the controller included in the vehicle suspension control apparatus determines the type of obstacle when an illuminance value does not exceed the second reference illuminance value according to an form of the present disclosure.

When an illuminance value measured by the illuminance sensor 30 does not exceed the second reference illuminance value, it means that the sun has set. At night, despite a street lamp, a large portion of the shape of an obstacle does not clearly appear in an image of a road surface taken with the camera 20, and therefore the controller 40 may not accurately determine the type of bump from the image of the road surface.

A illustrated in FIG. 4C, the controller 40 does not accurately classify the bump of the first type and the bump of the fourth type and does not accurately classify the bump of the third type and the bump of the fourth type.

Accordingly, the controller 40 integrates region A into region B, integrates region D into region C, and classifies the types of obstacles into the second type and the third type. That is, the controller 40 may determine the type of the obstacle to be the second type or the third type and may control the suspension 200, based on control information corresponding to the relevant type.

Because it is difficult to classify a bump as it gets darker, the controller 40 may divide bumps having similar sizes into groups, may determine a representative type of each group, and may control the suspension 200 based on control information corresponding to the determined bump type.

Hereinafter, a process in which the controller 40 controls the suspension 200 will be described in detail with reference to FIGS. 5 to 7.

Figure 5:
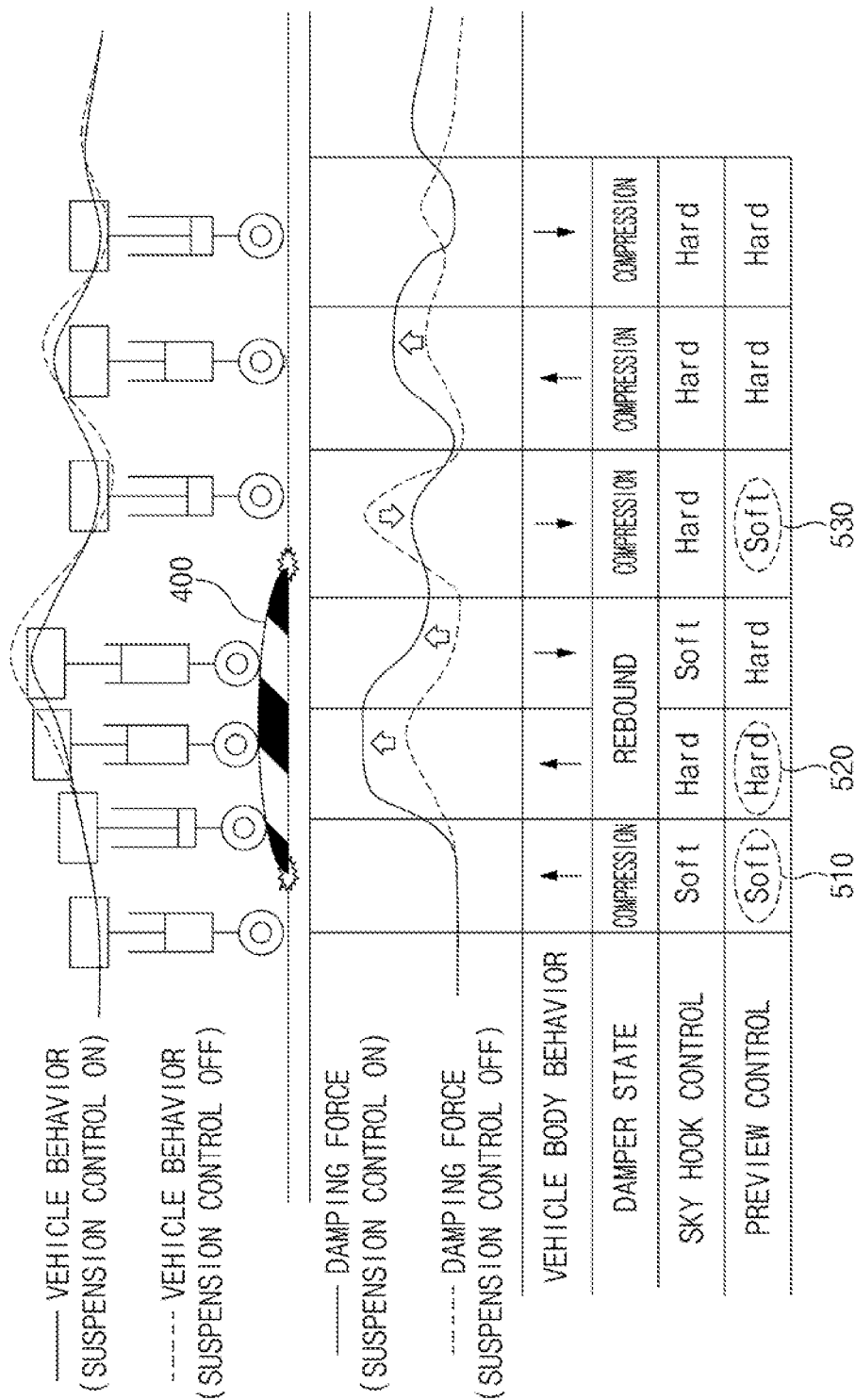
FIG. 5 is an exemplary view illustrating a process in which the controller included in the vehicle suspension control apparatus adjusts the damping force of suspension according to an exemplary form of the present disclosure.

FIG. 5 is an exemplary view illustrating a process in which the controller included in the vehicle suspension control apparatus adjusts the damping force of the suspension according to an exemplary form of the present disclosure. FIG. 6 is an exemplary view illustrating a damping force control command generated by the controller included in the vehicle suspension control apparatus according to an exemplary form of the present disclosure. FIG. 7 is an exemplary view illustrating a current change of the suspension controlled by the controller included in the vehicle suspension control apparatus and response characteristics of the solenoid valve according to another form of the present disclosure. In FIG. 5, suspension control ON represents a case of controlling the suspension 200 according to a method (preview) of the present disclosure, and suspension control OFF represents a case of controlling suspension according to a method in the related art.

Referring to FIG. 5, the controller 40 may estimate the distance to the bump 400 and time taken to reach the bump 400 and may control the suspension 200 based on control information (damping force adjustment information) corresponding to the type of the bump 400 when the vehicle passes over the bump 400. The controller 40 may control the suspension 200 in each of a plurality of control sections while the vehicle passes over the bump 400. The controller 40 may set the plurality of control sections corresponding to the type of the bump 400.

For example, the controller 40 may control the suspension 200 such that a damping force is decreased in boundary sections between a road surface and the bump 400. In a section (d0-d1 in FIG. 6) including a point where front wheels of the vehicle enter the bump 400, the vehicle is raised, and the spring is compressed. In this case, shock may be applied to the vehicle, and the controller 40 may reduce the shock by decreasing the damping force. That is, the controller 40 may operate the suspension 200 in a soft mode 510.

The controller 40 may control the suspension 200 such that the damping force is increased in a section (d1-d2 in FIG. 6) in which the front wheels of the vehicle enter the bump 400. The vehicle may greatly vibrate immediately after the front wheels of the vehicle enter the bump 400. In this case, the controller 40 may reduce a behavior change of the vehicle by increasing the damping force. That is, the controller 40 may operate the suspension 200 in a hard mode 520.

In a section (d2-d3 in FIG. 6) in which the front wheels of the vehicle exit the bump 400, shock may be applied to the vehicle again. Even in this case, the controller 40 may reduce the shock by decreasing the damping force. That is, the controller 40 may operate the suspension 200 in a soft mode 530.

The vehicle may vibrate even after rear wheels of the vehicle completely pass over the bump 400, and therefore the controller 40 may reduce a behavior change of the vehicle by increasing the damping force again in a section (d3-d4 in FIG. 6) immediately after the vehicle exits the bump 400. In this case, the damping force may be smaller than the damping force in the section d1-d2.

Even in a subsequent section (after d4 in FIG. 6), the controller 40 may continue to perform the damping force control for reducing a behavior change of the vehicle. That is, by adjusting the damping force in each of the plurality of control sections while the vehicle passes over the bump 400, the controller 40 may reduce vibration (pitch rate) of the vehicle and may decrease shock transmitted to the vehicle body.

Meanwhile, setting control information of the suspension 200 in advance to respond to the bump 400 on the road surface ahead the vehicle may be defined as a suspension adjustment function. Furthermore, the vehicle may be equipped with a user interface for inputting execution of the suspension adjustment function or inputting stop of execution of a preview function.

Figure 6:
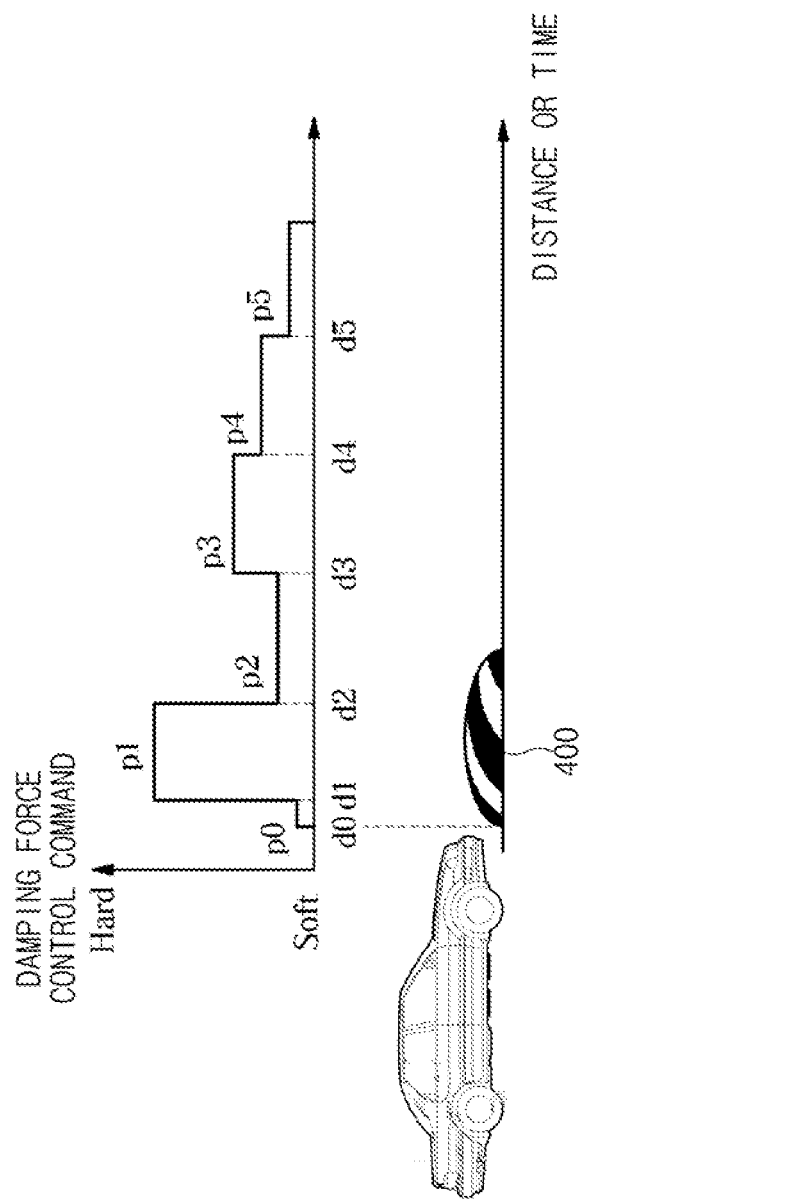
FIG. 6 is an exemplary view illustrating a damping force control command generated by the controller included in the vehicle suspension control apparatus according to an exemplary form of the present disclosure.
Figure 7:
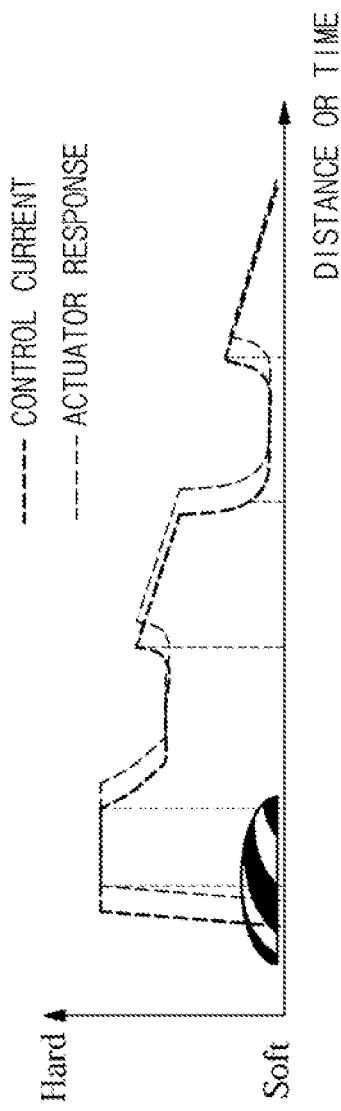
FIG. 7 is an exemplary view illustrating a current change of the suspension controlled by the controller included in the vehicle suspension control apparatus and response characteristics of a solenoid valve according to an exemplary form of the present disclosure.

Referring to FIG. 7, electric current applied to a drive circuit of the suspension 200 according to the damping force control command illustrated in FIG. 6 and a response of an actuator are illustrated. That is, to control the actuator of the damper, the controller 40 may apply electric current to the drive circuit of the suspension 200. The time when the actuator of the damper responds may be delayed, compared to the time when control current is applied by the controller 40. However, the delay time is very short. The damping force may be adjusted depending on operation of the actuator of the damper.

Figure 8:
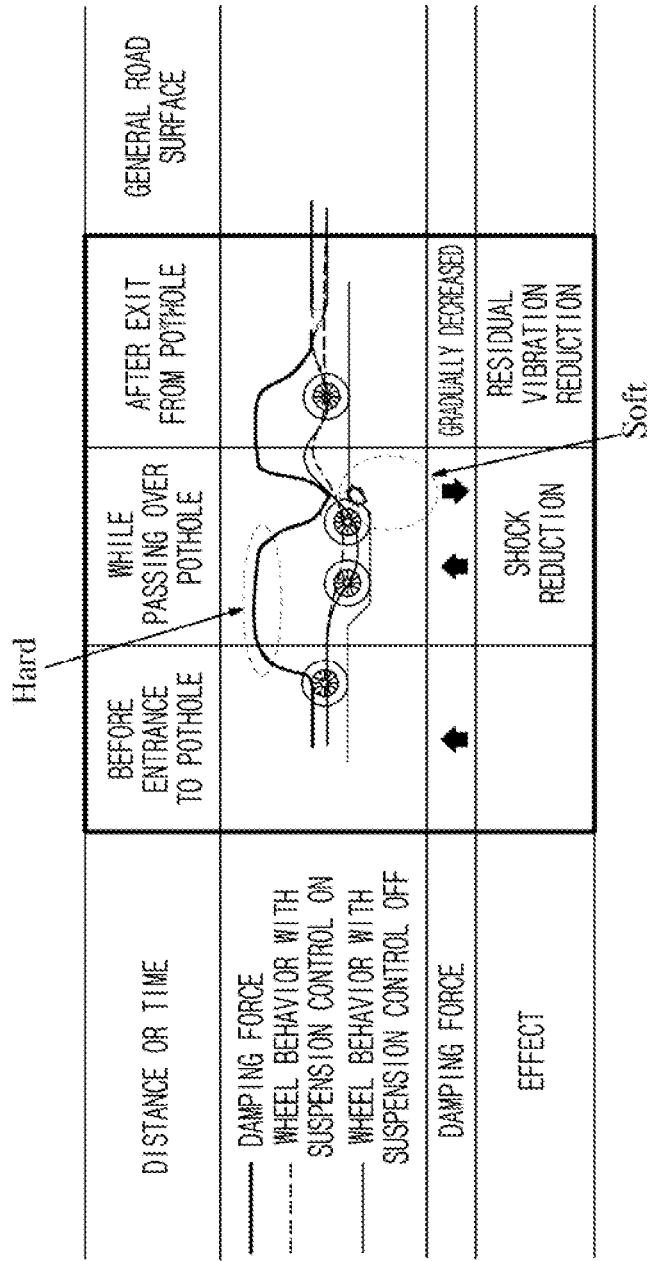
FIG. 8 is another exemplary view illustrating a process in which the controller included in the vehicle suspension control apparatus adjusts the damping force of the suspension according to an exemplary form of the present disclosure.

FIG. 8 is another exemplary view illustrating a process in which the controller included in the vehicle suspension control apparatus adjusts the damping force of the suspension according to an exemplary form of the present disclosure.

Referring to FIG. 8, when an obstacle is a pothole, the controller 40 controls the suspension 200 such that a damping force is increased in an entrance section of the pothole (a hard mode). When shock is expected in an exit section of the pothole, the controller 40 may control the suspension 200 such that the damping force is decreased in the exit section of the pothole (a soft mode). When the vehicle passes over the pothole, the wheels (tires) of the vehicle may collide with an end (an exit end) of the pothole without touching the bottom of the pothole. In this case, the controller 40 may increase the damping force in the entrance section of the pothole to hold the wheels and may decrease the damping force in the exit section of the pothole to absorb shock. Thus, vibration of the vehicle and shock transmitted to the vehicle may be decreased. In FIG. 8, suspension control ON represents a case of controlling the suspension 200 according to a method (preview) of the present disclosure, and suspension control OFF represents a case of controlling suspension according to a method in the related art.

Figure 9:
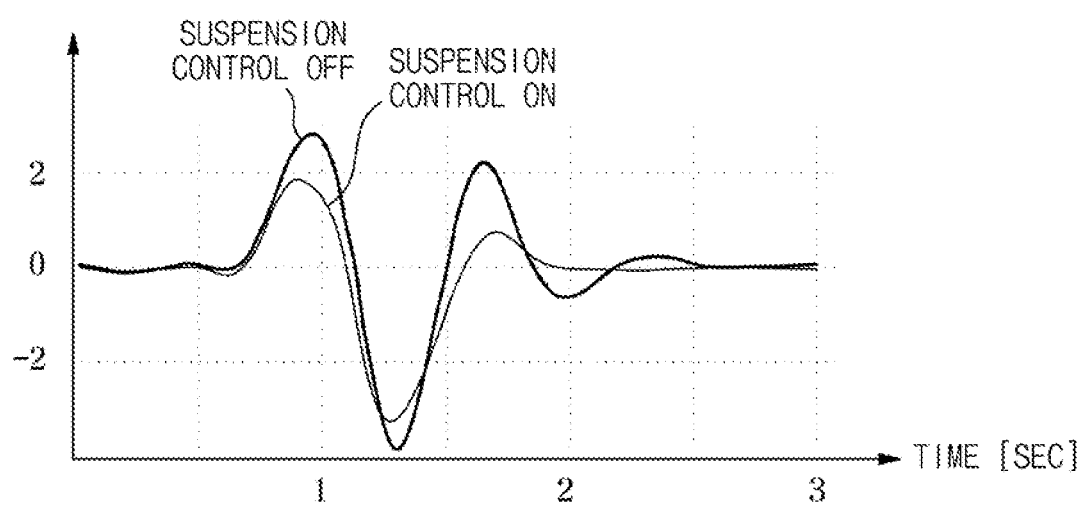
FIG. 9 is a performance analysis diagram of the vehicle suspension control apparatus according to an exemplary form of the present disclosure.

FIG. 9 is a performance analysis diagram of the vehicle suspension control apparatus according to an exemplary form of the present disclosure. FIG. 9 illustrates vehicle motion when a vehicle passes over a bump of the third type at a speed of 30 kph.

As illustrated in FIG. 9, vehicle motion when the present disclosure is applied (suspension control ON) is less than vehicle motion when the present disclosure is not applied (suspension control OFF).

Figure 10:
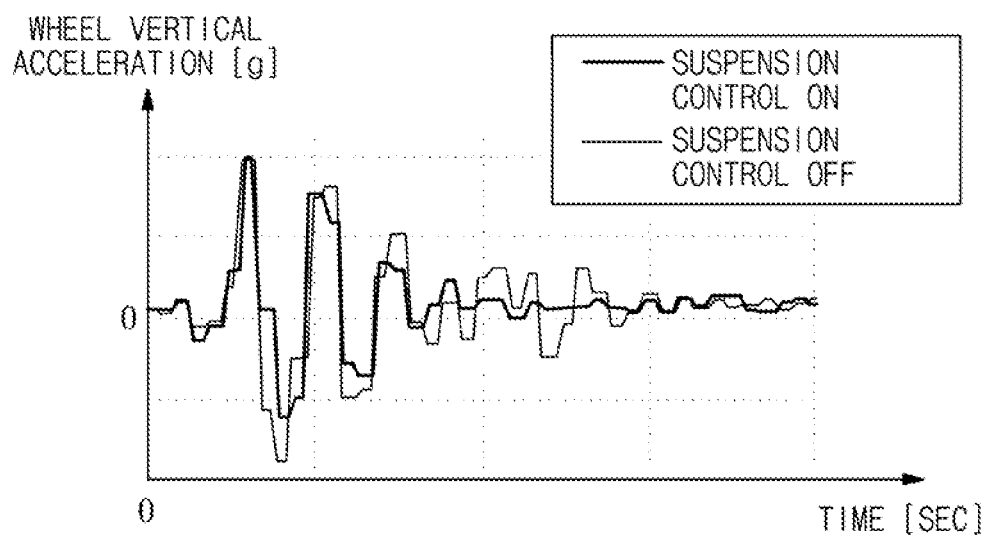
FIG. 10 is a performance analysis diagram of the vehicle suspension control apparatus according to an exemplary form of the present disclosure.

FIG. 10 is a performance analysis diagram of the vehicle suspension control apparatus according to an exemplary form of the present disclosure. FIG. 10 illustrates vehicle motion when a vehicle passes over a bump of the third type at a speed of 30 kph.

As illustrated in FIG. 10, impulse (a shock force) applied to the vehicle when the present disclosure is applied (suspension control ON) is less than impulse applied to the vehicle when the present disclosure is not applied (suspension control OFF).

Figure 11:
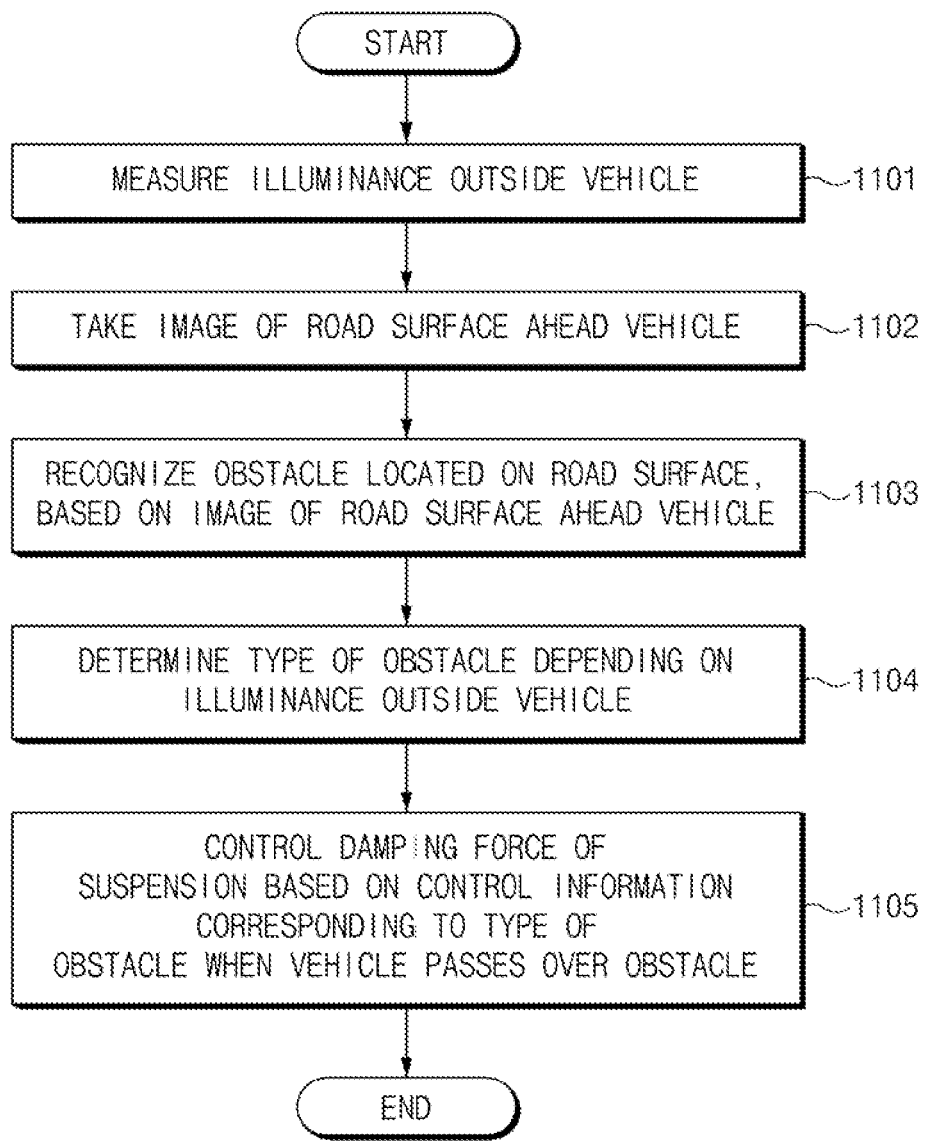
FIG. 11 is a flowchart illustrating a vehicle suspension control method according to an exemplary form of the present disclosure.

FIG. 11 is a flowchart illustrating a vehicle suspension control method according to another form of the present disclosure.

First, the illuminance sensor 30 measures illuminance outside a vehicle (at step 1101).

Next, the camera 30 takes an image of a road surface ahead the vehicle (at step 1102).

Then, the controller 40 recognizes an obstacle located on the road surface, based on the image of the road surface ahead the vehicle (at step 1103).

After that, the controller 40 determines the type of the obstacle depending on the illuminance outside the vehicle (at step 1104).

When the vehicle passes over the obstacle, the controller 40 controls the damping force of the suspension, based on control information corresponding to the type of the obstacle (at step 1105).

In the form of the present disclosure, the camera 20 has been described as an example. However, a LiDAR sensor, a radar sensor, or an ultrasonic sensor may be used.

Figure 12:
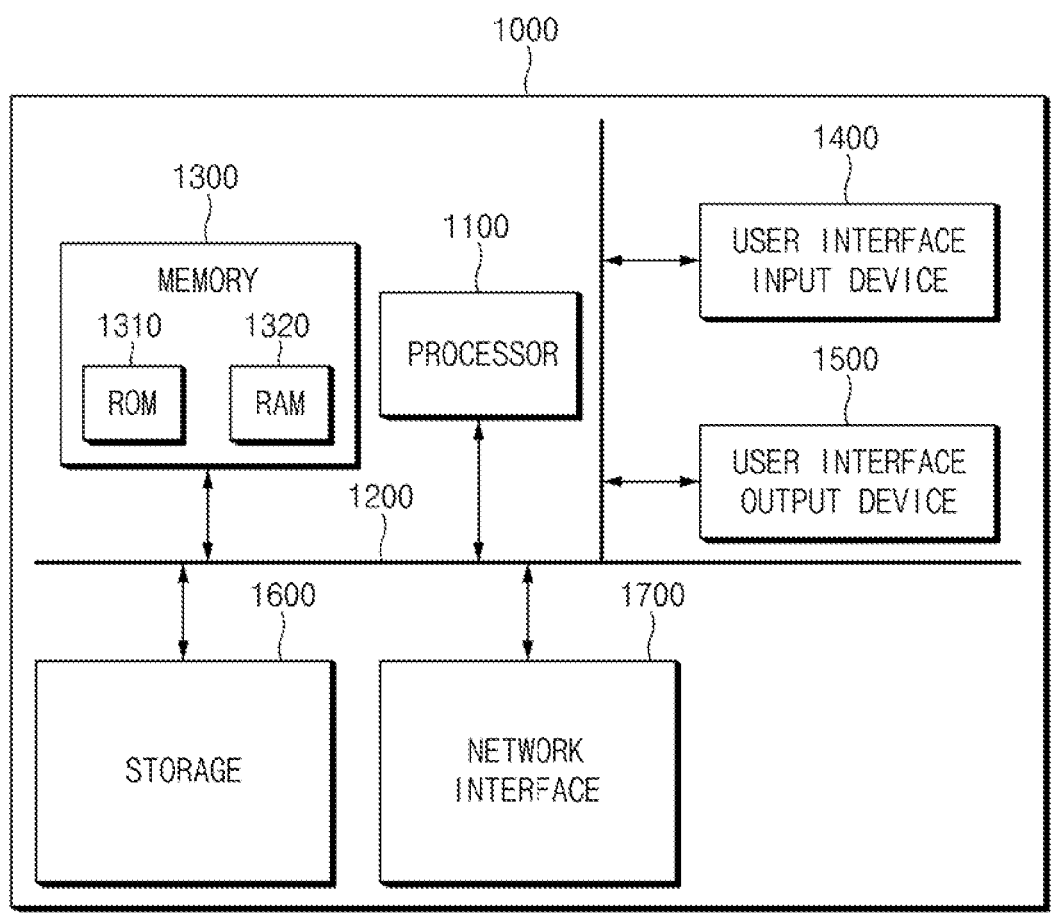
FIG. 12 is a block diagram illustrating a computing system for executing the vehicle suspension control method according to an exemplary form of the present disclosure.

FIG. 12 is a block diagram illustrating a computing system for executing the vehicle suspension control method according to an exemplary form of the present disclosure.

Referring to FIG. 12, the vehicle suspension control method may be implemented through the computing system. The computing system 1000 may include at least one processor 1100, a memory 1300, a user interface input device 1400, a user interface output device 1500, storage 1600, and a network interface 1700, which are connected with each other via a system bus 1200.

The processor 1100 may be a Central Processing Unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) 1310 and a Random Access Memory (RAM) 1320.

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an Application Specific Integrated Circuit (ASIC). The ASIC may reside within a user terminal. In another case, the processor 1100 and the storage medium may reside in the user terminal as separate components.

As described above, the vehicle suspension control apparatus and method according to the forms of the present disclosure recognizes the obstacle located on the road surface ahead the vehicle, determines the type of the obstacle depending on brightness (e.g., an illuminance value) outside the vehicle, and controls the suspension based on the control information corresponding to the type of the obstacle when the vehicle passes over the obstacle, thereby improving ride comfort.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An apparatus for controlling a suspension of a vehicle, the apparatus comprising:
   an illuminance sensor configured to measure illuminance outside the vehicle;
   a camera configured to take an image of a road surface ahead the vehicle; and
   a controller configured to:
      recognize an obstacle located on the road surface based on the image of the road surface ahead the vehicle,
      determine a type of the obstacle based on the measured illuminance, and
      control a damping force of the suspension based on control information corresponding to the determined type of the obstacle when the vehicle passes over the obstacle,
   wherein the controller is further configured to divide the measured illuminance into a plurality of sections and differently set criteria for determining the type of the obstacle in the respective sections, and
   wherein:
      the plurality of sections includes a first section with a first measured illuminance value and a second section with a second measured illuminance value that is less than the first measured illuminance value,
      the controller is configured to set a first number of the criteria for the first section and a second number of the criterial for the second section, and
      the first number of criteria is greater than the second number of criteria.

2. The apparatus of claim 1, wherein the obstacle includes at least one of a bump or a pothole located in the road surface on which the vehicle travels.

3. The apparatus of claim 2, wherein when the measured illuminance exceeds a first reference illuminance value, the controller is configured to determine the type of the obstacle from at least four types of bumps having different shapes.

4. The apparatus of claim 3, wherein the at least four types of bumps include a first type of bump, a second type of bump, a third type of bump and a fourth type of bump, which have different heights and different lengths.

5. The apparatus of claim 4, wherein when the measured illuminance exceeds a second reference illuminance value, the controller is configured to integrate a criterion for determining the fourth type of bump into a criterion for determining the third type of bump, and determine the type of the obstacle to be one type of bump among the first type of bump, the second type of bump, and the third type of bump.

6. The apparatus of claim 5, wherein the controller is configured to set a plurality of control sections corresponding to the determined type of bump and control the damping force of the suspension in each of the plurality of control sections when the vehicle passes over the determined type of bump.

7. The apparatus of claim 4, wherein when the measured illuminance does not exceed a second reference illuminance value, the controller is configured to:
   integrate a criterion for determining the first type of bump into a criterion for determining the second type of bump,
   integrate a criterion for determining the fourth type of bump into a criterion for determining the third type of bump, and
   determine the type of the obstacle to be the second type of bump or the third type of bump.

8. The apparatus of claim 7, wherein the controller is configured to set a plurality of control sections corresponding to the determined type of bump and control the damping force of the suspension in each of the plurality of control sections when the vehicle passes over the determined type of bump.

9. The apparatus of claim 3, wherein the controller is configured to set a plurality of control sections corresponding to the determined type of obstacle and control the damping force of the suspension in each of the plurality of control sections when the vehicle passes over the determined type of obstacle.

10. A method for controlling suspension of a vehicle, the method comprising:
   measuring, by an illuminance sensor, illuminance outside the vehicle;
   taking, by a camera, an image of a road surface ahead the vehicle;
   recognizing, by a controller, an obstacle located on the road surface based on the image of the road surface ahead the vehicle;
   determining, by the controller, a type of the obstacle based on the measured illuminance; and
   controlling, by the controller, a damping force of the suspension based on control information corresponding to the determined type of the obstacle when the vehicle passes over the obstacle,
   wherein determining the type of the obstacle includes:
      dividing the measured illuminance into a plurality of sections;
      differently setting criteria for determining the type of the obstacle in the respective sections, wherein the plurality of sections includes a first section with a first measured illuminance value and a second section with a second measured illuminance value that is less than the first measured illuminance value; and setting a first number of the criteria for the first section and a second number of the criterial for the second section, wherein the first number of criteria is greater than the second number of criteria.

11. The method of claim 10, wherein the obstacle includes at least one of a bump or a pothole located in the road surface on which the vehicle travels.

12. The method of claim 11, wherein the bump is classified as one type of bump, among a first type of bump, a second type of bump, a third type of bump, and a fourth type of bump, based on a height and a length of the bump.

13. The method of claim 12, wherein determining the type of the obstacle includes:
   when the measured illuminance exceeds a first reference illuminance value, determining the type of the obstacle to be one type of the bump among the first type of bump, the second type of bump, the third type of bump, and the fourth type of bump.

14. The method of claim 13, wherein controlling the damping force of the suspension includes:
   setting a plurality of control sections corresponding to the determined type of bump; and
   controlling the damping force of the suspension in each of the plurality of control sections when the vehicle passes over the determined type of bump.

15. The method of claim 12, wherein determining the type of the obstacle includes:
   when the measured illuminance exceeds a second reference illuminance value, integrating a criterion for determining the fourth type of bump into a criterion for determining the third type of bump; and
   determining the type of the obstacle to be the first type of bump, the second type of bump, or the third type of bump.

16. The method of claim 15, wherein controlling the damping force of the suspension includes:
   setting a plurality of control sections corresponding to the determined type of bump; and
   controlling the damping force of the suspension in each of the plurality of control sections when the vehicle passes over the determined type of bump.

17. The method of claim 12, wherein determining the type of the obstacle includes:
   when the measured illuminance does not exceed a second reference illuminance value, integrating a criterion for determining the first type of bump into a criterion for determining the second type of bump and integrating a criterion for determining the fourth type of bump into a criterion for determining the third type of bump; and
   determining the type of the obstacle to be the second type of bump or the third type of bump.

18. The method of claim 17, wherein controlling the damping force of the suspension includes:
   setting a plurality of control sections corresponding to the determined type of bump; and
   controlling the damping force of the suspension in each of the plurality of control sections when the vehicle passes over the determined type of bump.

* * * * *